(12) United States Patent
Tanaka et al.

(10) Patent No.: US 10,037,172 B2
(45) Date of Patent: Jul. 31, 2018

(54) MEMORY SYSTEM AND CONTROLLING METHOD

(71) Applicant: Toshiba Memory Corporation, Minato-ku (JP)

(72) Inventors: Takeshi Tanaka, Kawasaki (JP); Kenichi Iwai, Yokohama (JP); Maoko Oyamada, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 29 days.

(21) Appl. No.: 15/194,788

(22) Filed: Jun. 28, 2016

(65) Prior Publication Data

US 2017/0228159 A1    Aug. 10, 2017

Related U.S. Application Data

(60) Provisional application No. 62/292,889, filed on Feb. 9, 2016.

(51) Int. Cl.
*G06F 3/06* (2006.01)

(52) U.S. Cl.
CPC .......... *G06F 3/0679* (2013.01); *G06F 3/0616* (2013.01); *G06F 3/0659* (2013.01)

(58) Field of Classification Search
CPC ..... G06F 3/0679; G06F 3/0659; G06F 3/0604
USPC ........................................................ 711/103
See application file for complete search history.

(56) References Cited

U.S. PATENT DOCUMENTS

| 8,862,807 | B2 | 10/2014 | Yoon et al. |
| 9,058,114 | B2 | 6/2015 | Tressler et al. |
| 2008/0126719 | A1 | 5/2008 | Danilak |
| 2012/0047317 | A1* | 2/2012 | Yoon ..................... G06F 3/0613 711/103 |
| 2012/0297127 | A1* | 11/2012 | Belluomini ......... G06F 12/0866 711/103 |
| 2014/0173268 | A1 | 6/2014 | Hashimoto |
| 2015/0185813 | A1 | 7/2015 | Ping et al. |
| 2016/0320995 | A1* | 11/2016 | Warriner ............... G06F 3/0625 |

FOREIGN PATENT DOCUMENTS

| JP | 2014-78262 | 5/2014 |
| JP | 5535383 | 7/2014 |
| JP | 2015-127955 | 7/2015 |

* cited by examiner

*Primary Examiner* — Jasmine Song
(74) *Attorney, Agent, or Firm* — Oblon, McClelland, Maier & Neustadt, L.L.P.

(57) ABSTRACT

According to one embodiment, a memory system includes a controller. The controller controls throttling to make a performance value of the memory system fall between a first performance value and a second performance value. The throttling limits the number of times of accesses per unit time to a nonvolatile memory. The first performance value is calculated based on a third performance value of the memory system and is greater than the third performance value. The third performance value is a value which is expected to be reached at a time when a first period has elapsed since the memory system started being used if throttling is not performed. The second performance value is provided between the first performance value and the third performance value.

19 Claims, 8 Drawing Sheets

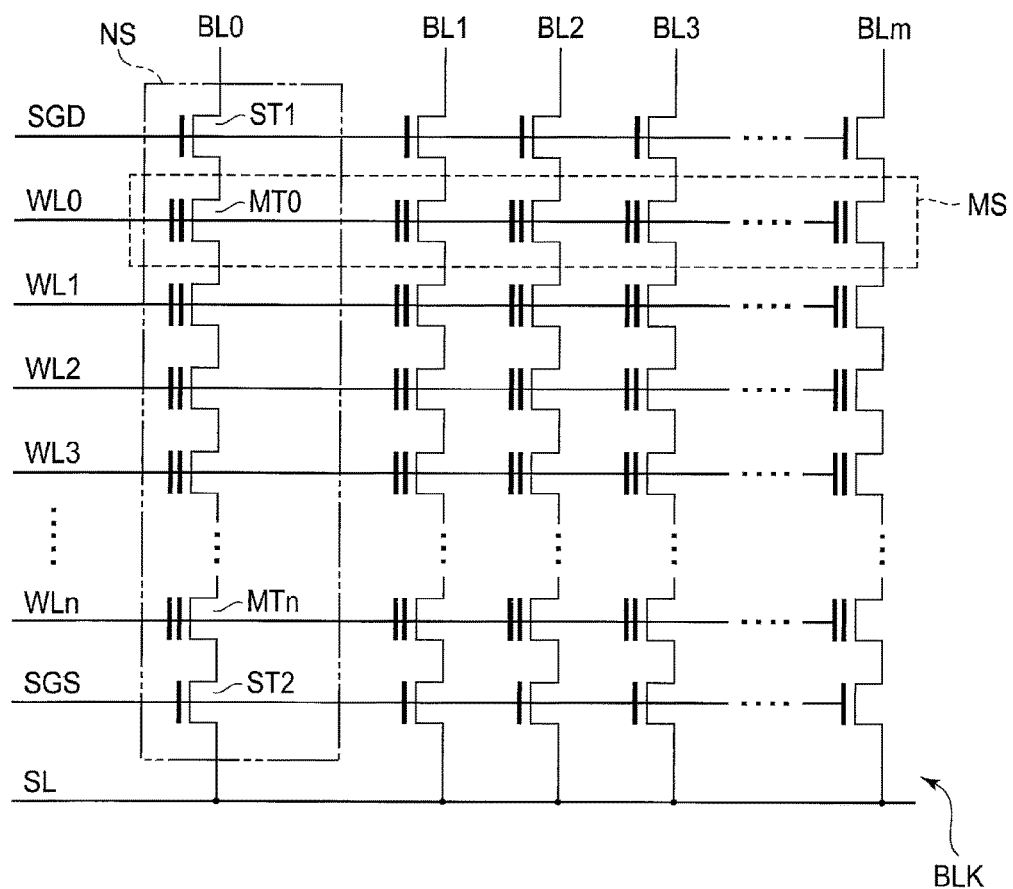
F I G. 2

| Bit Byte | 7 | 6 | 5 | 4 | 3 | 2 | 1 | 0 |
|---|---|---|---|---|---|---|---|---|
| 0 | PS | SPF(1b) | | | PAGE CODE (0Ah) | | | |
| 1 | | | | SUBPAGE CODE (01h) | | | | |
| 2 | (MSB) | | | PAGE LENGTH (001Ch) | | | | |
| 3 | | | | | | | | (LSB) |
| 4 | Reserved | | | | DLC | TCMOS | SCSIP | IALUAE |
| 5 | Reserved | | | | | | | |
| 6 | MAXIMUM SENSE DATA LENGTH | | | | | | | |
| 7 ... 31 | Reserved | | | | | | | |

F I G. 3

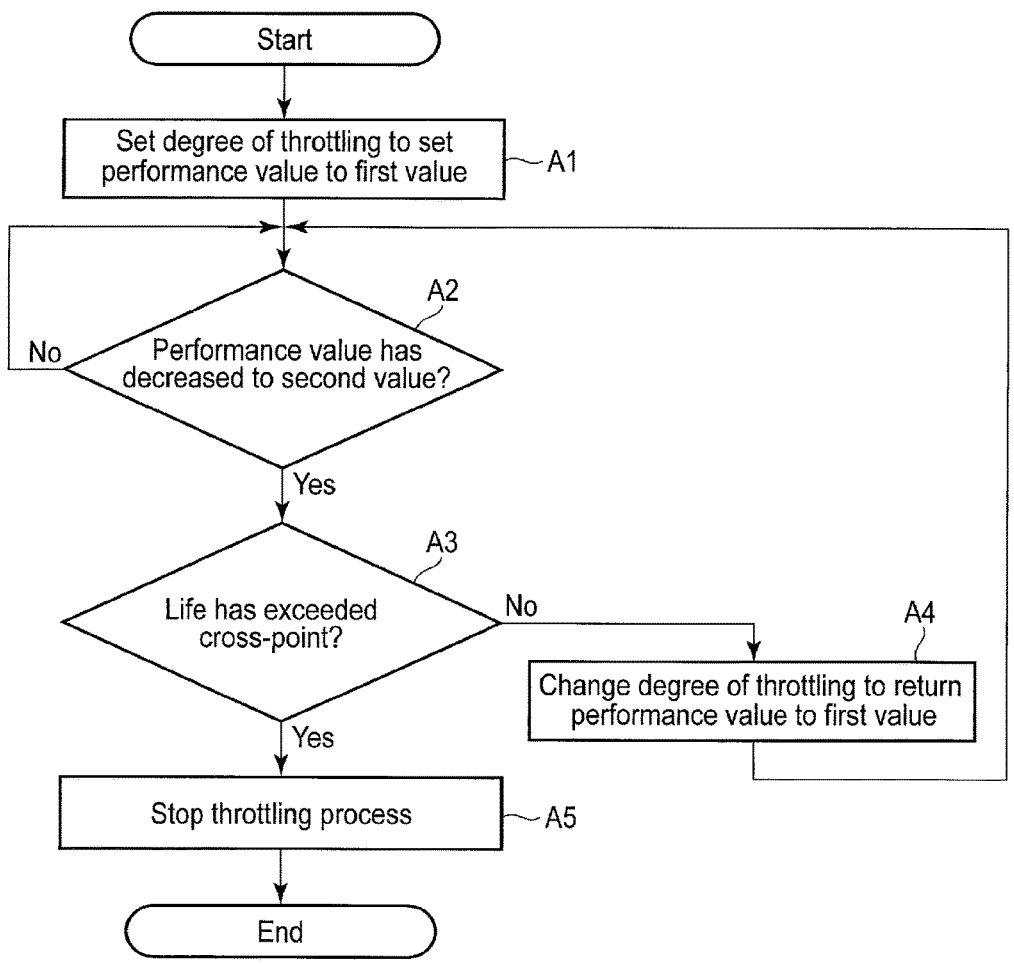
F I G. 7

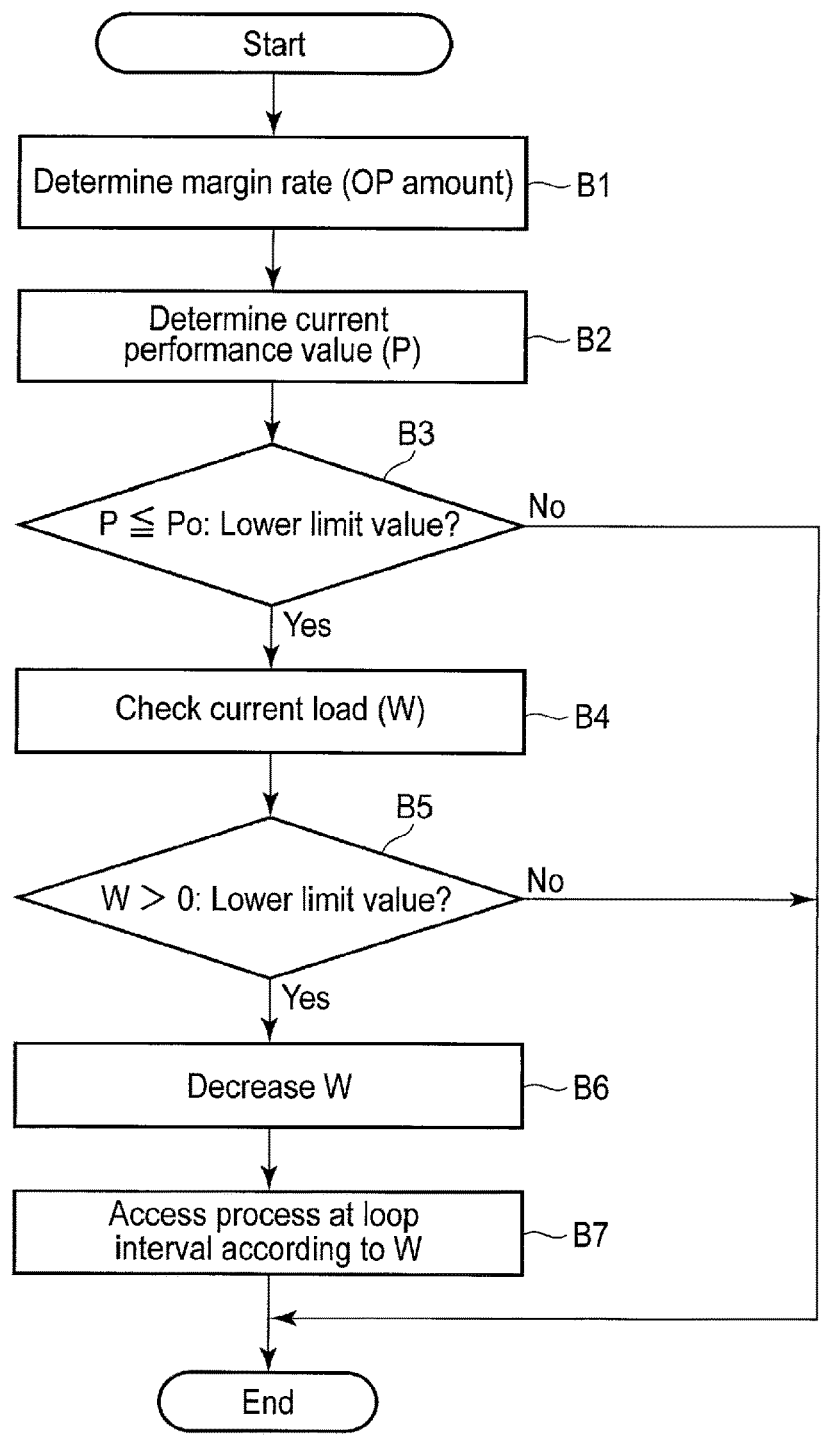
F I G. 8

MEMORY SYSTEM AND CONTROLLING METHOD

CROSS-REFERENCE TO RELATED APPLICATIONS

This application claims the benefit of U.S. Provisional Application No. 62/292,889, filed Feb. 9, 2016, the entire contents of which are incorporated herein by reference.

FIELD

Embodiments described herein relate generally to a memory system and a controlling method.

BACKGROUND

In recent years, memory systems comprising nonvolatile memories have become widespread. As one such memory system, a solid-state drive (SSD) comprising a NAND flash memory (hereinafter referred to as a NAND memory) is known. The SSD is used as main storage of various information processing apparatuses.

In the SSD, a controller which executes overall control over each structural element, more specifically, controls access to the NAND memory in accordance with a request from a host device, is installed. In addition, the SSD is required to operate with priority given to performance, or conversely, operate with a certain level of performance maintained during a predetermined period, even if the performance is restrained to some extent, for example, in accordance with a request (setting) of the host device. To respond to such a request, it is important to appropriately control the performance of the SSD by the controller in consideration of a life.

BRIEF DESCRIPTION OF THE DRAWINGS

FIG. 2 is a diagram showing a structural example of blocks of a memory cell array.

FIG. 3 is a diagram showing a format of a Control Extension mode page defined according to the SCSI standard.

FIG. 7 is a flowchart showing a general procedure through which the performance is controlled by throttling in the memory system of the embodiment.

FIG. 8 is a flowchart showing a procedure for periodic operations related to throttling of the memory system of the embodiment.

DETAILED DESCRIPTION

In general, according to one embodiment, a memory system includes a nonvolatile memory and a controller. The controller is configured to control access to the nonvolatile memory based on a command from a host device. The controller is configured to control throttling to make a performance value of the memory system fall between a first performance value and a second performance value, when a first command related to a setting of the memory system is received from the host device. The throttling limits the number of times of accesses per unit time to the nonvolatile memory. The first performance value is a value which is calculated based on a third performance value of the memory system and which is greater than the third performance value. The third performance value is a value which is expected to be reached at a time when a first period has elapsed since the memory system started being used if throttling is not performed. The second performance value is a value provided between the first performance value and the third performance value.

Figure 1:
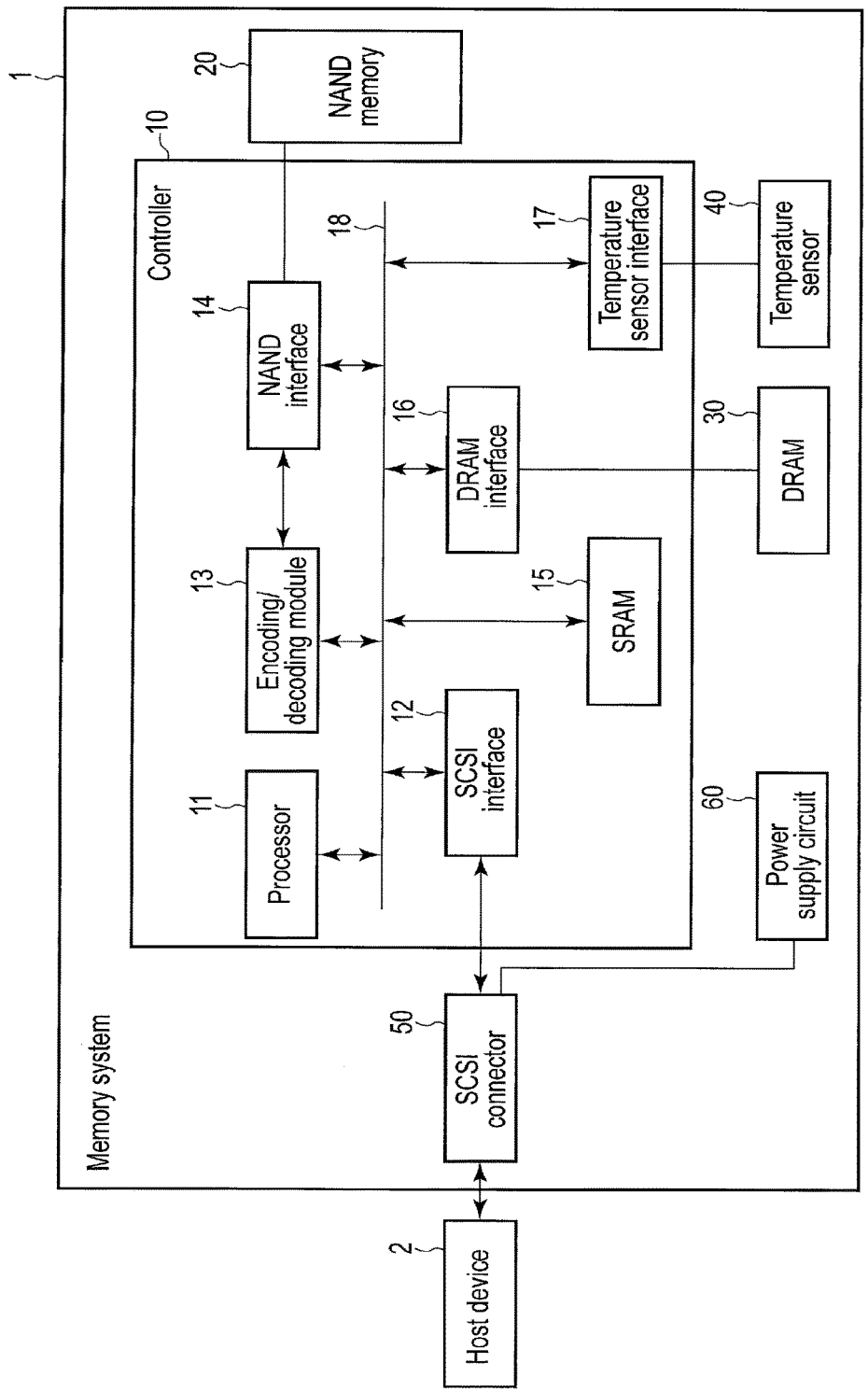
FIG. 1 is a diagram showing an example of a configuration of a memory system of an embodiment.

FIG. 1 is a diagram showing an example of a configuration of a memory system 1 of a present embodiment. The memory system 1 is a storage device configured to write data to a nonvolatile memory and read data from the nonvolatile memory. The memory system 1 is implemented as, for example, an SSD comprising a NAND memory 20. An example in which the NAND memory 20 is used as the nonvolatile memory will be herein described. However, the nonvolatile memory may be a nonvolatile semiconductor memory other than the NAND memory 20, such as a three-dimensional structure flash memory, a resistive random access memory (ReRAM), or a ferroelectric random access memory (FeRAM).

The memory system 1 is used as an external storage device of a host device 2. The host device 2 may be, for example, an information processing apparatus such as a personal computer or a server, a mobile phone, a camera, a mobile device such as a tablet computer or a smartphone, a game console, or vehicle-mounted equipment such as a satellite navigation system.

It is herein assumed that as an interface for interconnection between the memory system 1 and the host device 2, an interface conforming to the Small Computer System Interface (SCSI) standard, for example, Serial Attached SCSI (SAS) is used. According to the SCSI standard, various commands for determining the settings of a peripheral device (SCSI device) are defined. The memory system 1 of the present embodiment appropriately controls the performance of the memory system 1 in accordance with the various commands.

As shown in FIG. 1, the memory system 1 comprises a controller 10, the NAND memory 20, a dynamic random access memory (DRAM) 30, a temperature sensor 40, a SCSI connector 50, a power supply circuit 60, etc.

The controller 10 executes overall control over each structural element of the memory system 1. Upon receipt of a command from the host device 20 via the SCSI connector 50, the controller 10 executes control according to the command. The controller 10 comprises a processor 11, a SCSI interface 12, an encoding/decoding module 13, a NAND interface 14, a static random access memory (SRAM) 15, a DRAM interface 16, a temperature sensor interface 17, etc., which will be described later. The processor 11, the SCSI interface 12, the encoding/decoding module 13, the NAND interface 14, the SRAM 15, the DRAM interface 16, and the temperature sensor interface 17 are interconnected via a bus 18.

The NAND memory 20 comprises one or more memory chips comprising a memory cell array. The memory cell array comprises memory cells arranged in a matrix. The memory cell array comprises blocks, which are units of data deletion. Each of the blocks is constituted of physical sectors.

FIG. 2 is a diagram showing a structural example of the blocks of the memory cell array. FIG. 2 shows one of the blocks constituting the memory cell array. The other blocks of the memory cell array also have the same structure as shown in FIG. 2. As shown in FIG. 2, a block BLK of the memory cell array comprises m+1 (m is an integer greater than or equal to zero) NAND strings NS. Each of the NAND strings NS comprises n+1 (n is an integer greater than or equal to zero) memory cell transistors MT0 to MTn which are connected in series with a diffusion area (a source area or a drain area) shared between adjacent memory cell transistors MT, and select transistors ST1 and ST2 disposed at both ends of a column of the n+1 memory cell transistors MT0 to MTn.

Word lines WL0 to WLn are connected to control gate electrodes of the memory cell transistors MT0 to MTn constituting the NAND strings NS, respectively, and memory cell transistors MTi (i=0 to n) in the respective NAND strings NS are connected in common by the same word line WLi (i=0 to n). That is, control gate electrodes of the memory cell transistors MTi in the same row in the block BLK are connected to the same word line WLi.

Each of the memory cell transistors MT0 to MTn is constituted of a field-effect transistor having a stacked gate structure formed on a semiconductor substrate. The stacked gate structure herein includes a charge storage layer (floating gate electrode) which is formed on the semiconductor substrate with a gate insulating film interposed therebetween, and a control gate electrode which is formed on the charge storage layer with a gate insulating film interposed therebetween. A threshold voltage of the memory cell transistors MT0 to MTn varies in accordance with the number of electrons stored in the floating gate electrode, and data can be stored in accordance with variations in the threshold voltage.

Bit lines BL0 to BLm are connected to the drains of m+1 select transistors ST1 in the one block BLK, respectively, and a select gate line SGD is connected in common to the gates. In addition, the sources of the select transistors ST1 are connected to the drains of the memory cell transistors MT0. Similarly, a source line SL is connected in common to the sources of m+1 select transistors ST2 in the one block BLK, and a select gate line SGS is connected in common to the gates. The drains of the select transistors ST2 are connected to the sources of the memory cell transistors MTn.

Each of the memory cells is connected to a bit line as well as a word line. Each of the memory cells can be identified by an address which identifies a word line and an address which identifies a bit line. As described above, data in memory cells (memory cell transistors MT) in the same block BLK is erased all together. On the other hand, data is read and written in units of pages. If only two values can be stored in each of the memory cells, one page corresponds to one physical sector MS including memory cells connected to one word line.

If multiple values can be stored in each of the memory cells and the memory cells operate in a single level cell (SLC) mode, one physical sector MS corresponds to one page. If the memory cells operate in a multilevel cell (MLC) mode, one physical sector MS corresponds to N pages (N is a natural number greater than or equal to two). If N=2, one physical sector MS corresponds to two pages, and if N=3, one physical sector MS corresponds to three pages.

At the time of a read operation and a program operation, one word line is selected and one physical sector MS is selected in accordance with a physical address. Pages in the physical sector MS are switched by the physical address.

As shown in FIG. 1, the NAND memory 20 comprising the one or more memory chips comprising the memory cell array comprising the blocks having the above-described structure is connected to the NAND interface 14 of the controller 10.

FIG. 1 is referred to again.

The DRAM 30 functions as a buffer for transferring write data and read data between the host device 2 and the NAND memory 20. The memory system 1 may comprise a magnetoresistive random access memory (MRAM) or a ferroelectric random access memory (FeRAM) instead of the DRAM 30. The DRAM 30 is connected to the DRAM interface 16 of the controller 10.

The temperature sensor 40 detects a temperature in the vicinity of, for example, the controller 10 or the NAND memory 20 in the memory system 1. The temperature detected by the temperature sensor 40 is used to, for example, monitor whether or not the temperature in the memory system 1 has fallen within a recommended operating temperature range. The temperature sensor 40 is connected to the temperature sensor interface 17 of the controller 10.

The SCSI connector 50 is a coupling unit for connecting the host device 2 and the memory system 1. The SCSI connector 50 is connected to the SCSI interface 12 of the controller 10. A command, user data, etc., from the host device 2 are received by the SCSI interface 12 via the SCSI connector 50. In addition, user data read from the NAND memory 20, a response from the controller 10 (to a command), etc., are transmitted to the host device 2 via the SCSI connector 50. The shape, etc., of the SCSI connector 50 are defined in conformity with the SCSI standard.

The power supply circuit 60 is connected to the host device 2 via the SCSI connector 50, and supplied with power from the host device 2 via the SCSI connector 50. The power supply circuit 60 is also connected to the controller 10, the NAND memory 20, the DRAM 30, and the temperature sensor 40 by a power supply line not shown in FIG. 1, and can supply the controller 10, the NAND memory 20, the DRAM 30, and the temperature sensor 40 with power supplied from the host device 2.

Next, the processor 11, the SCSI interface 12, the encoding/decoding module 13, the NAND interface 14, the SRAM 15, the DRAM interface 16, and the temperature sensor interface 17 of the controller 10 will be described.

For example, when the memory system 1 is started, firmware stored in the NAND memory 20 is separately loaded into the SRAM 15 and the DRAM 30 in the controller 10. More specifically, a module related to a frequently performed process and a module related to a process which requires high responsiveness are loaded into the SRAM 15, and a module related to a process which is infrequently performed and does not require high responsiveness is loaded into the DRAM 30. It is predetermined which part of the firmware is loaded into the SRAM 15 and which part is loaded into the DRAM 30. The processor 11 performs a predetermined process in accordance with the firmware. It suffices if the processor 11 can perform a predetermined process in accordance with the firmware, and the processor 11 is, for example, a central processing unit (CPU). It should be noted that the SRAM 15 also functions as a storage area of various management data items. One of the management data items is used to control the transfer of write data and read data between the host device 2 and the NAND memory 20. This management data item includes, for example, mapping data indicating the relationship between a logical address specified by the host device 2 and a storage location (physical address) in the NAND memory 20. Various management data items (for example, updated portions) in the SRAM 15 are stored in the NAND memory 20 (made nonvolatile) with a predetermined timing.

For example, the processor 11 performs a read process for the NAND memory 20 in accordance with a read command issued from the SCSI interface 12. The processor 11 performs the read process by acquiring a physical location in the NAND memory 20 corresponding to a physical address of read data from the management data items stored in the SRAM 15, and notifying the NAND interface 14 of the acquired physical location. The processor 11 uses the DRAM 30 as a buffer of read data. The read data is transmitted to the host device 2 via the encoding/decoding module 13 (decoding module), the DRAM 30, and the SCSI interface 12. In addition, the processor 11 performs a write process for the NAND memory 20 in accordance with a write command issued from the SCSI interface 12. The processor 11 writes a codeword created by the encoding/decoding module 13 (encoding module) to the NAND memory 20. The processor 11 uses the DRAM 30 as a buffer of data for writing. In addition, the processor 11 registers a mapping of a logical address and a physical location in the NAND memory 20 of written data in the management data items stored in the SRAM 15. Moreover, the processor 11 determines the settings of the memory system 1 in accordance with a command for setting issued from the SCSI interface 12. The processor 11 stores a set value (parameter) in the SRAM 15 as one of the management data items. As described above, various management data items (for example, updated portions) in the SRAM 15 are stored in the NAND memory 20 (made nonvolatile) with a predetermined timing.

The SCSI interface 12 performs communication for delivering a command, user data, a response to a command, etc., between the host device 2 and the controller 10, more specifically the processor 11, which are connected via the SCSI connector 50.

First, the encoding/decoding module 13 encodes user data buffered by the DRAM 30, and creates a codeword constituted of data and a redundancy (parity) (encoding module). Second, the encoding/decoding module 13 acquires a codeword read from the NAND memory 20 from the NAND interface 14, and decodes the acquired codeword (decoding module). If error correction fails at the time of decoding, the encoding/decoding module 13 notifies the processor 11 of a read error.

The NAND interface 14 directly controls the writing of data to the NAND memory 20 and the reading of data from the NAND 20 on the basis of a command from the processor 11. As described above, the SRAM 15 functions as a storage area of various management data items, as well as functioning as a storage area of firmware. The DRAM interface 16 directly controls the writing of data to the DRAM 30 and the reading of data from the DRAM 30 on the basis of a command from the processor 11. The temperature sensor interface 17 can directly control the reading of data (temperature data) from the temperature sensor 40 on the basis of a command from the processor 11.

Next, an operation example in which the controller 10 appropriately controls the performance of the memory system 1 in accordance with a command from the host device 2 in the memory system 1 having the above-described configuration will be described.

As described above, in the present embodiment, it is assumed that an interface conforming to the SCSI standard is used as an interface for interconnection between the memory system 1 and the host device 2. According to the SCSI standard, a MODE SELECT command is defined as one of the commands related to the settings of a peripheral device. The MODE SELECT command transfers a mode page with its purpose defined by a page code and a subpage code. The host device 2 can optionally determine the settings of the memory system 1 by issuing the MODE SELECT command for transferring a mode page in which a page code and a subpage code are appropriately set to the memory system 1. In other words, if the MODE SELECT command is issued by the host device 2, the memory system 1 determines the settings as indicated by the mode page transferred by the MODE SELECT command, and thereafter operates in accordance with the settings.

FIG. 3 is a diagram showing a format of a Control Extension mode page which is one of the mode pages defined according to the SCSI standard.

For the mode pages, two kinds of format, a page_0 mode page format and a SUB_PAGE mode page format, are defined, and the latter SUB_PAGE mode page format is applied to the Control Extension mode page. The page_0 mode page format and the SUB_PAGE mode page format are distinguished by the value of an SPF bit (a1 of FIG. 3). If the value of the SPF bit is "0b", the format is the page_0 mode page format, and if the value of the SPF bit is "1b", the format is the SUB_PAGE mode page format.

In addition, if the value of a PAGE CODE bit (a2 of FIG. 3) is "0Ah", and the value of a SUBPAGE CODE bit (a3 of FIG. 3) is "01h", it is indicated that the mode page is a Control Extension mode page.

As shown in FIG. 3, the Control Extension mode page is provided with a device life control (DLC) bit (a4 of FIG. 3). If the value of the DLC bit is "1b", it is indicated that the performance must not be decreased to prolong the life of the device. On the other hand, if the value of the DLC bit is "0b", it is indicated that the performance can be decreased to prolong the life of the device. However, even if the performance can be decreased, a storage device such as the memory system 1 of the present embodiment, for which a lifetime is generally set, is required to operate with a certain level or higher of performance during the lifetime.

On the other hand, the storage device such as the memory system 1 of the present embodiment has a limited number of program and erase (PE) cycles, and for example, if it continues being used with a write amplification factor kept high, the number of PE cycles can reach its upper limit (the life ends) before the expiration of a lifetime set for the storage device. The write amplification factor is an index that represents how many times greater the amount of data actually written to a nonvolatile memory is than the amount of data required to be written. Accordingly, the storage device is required to operate with substandard performance with which the number of PE cycles dose not reach the upper limit at least during the lifetime of the device.

In consideration of this point, the controller 10 appropriately controls the performance of the memory system 1, for example, such that a certain level or higher of performance is maintained during a predetermined lifetime while the number of PE cycles do not reach its upper limit before the expiration of the predetermined lifetime, if a Control Extension mode page with a DLC bit set to "0b" as the initial settings is transferred from the host device 2 by a MODE SELECT command.

Figure 4:
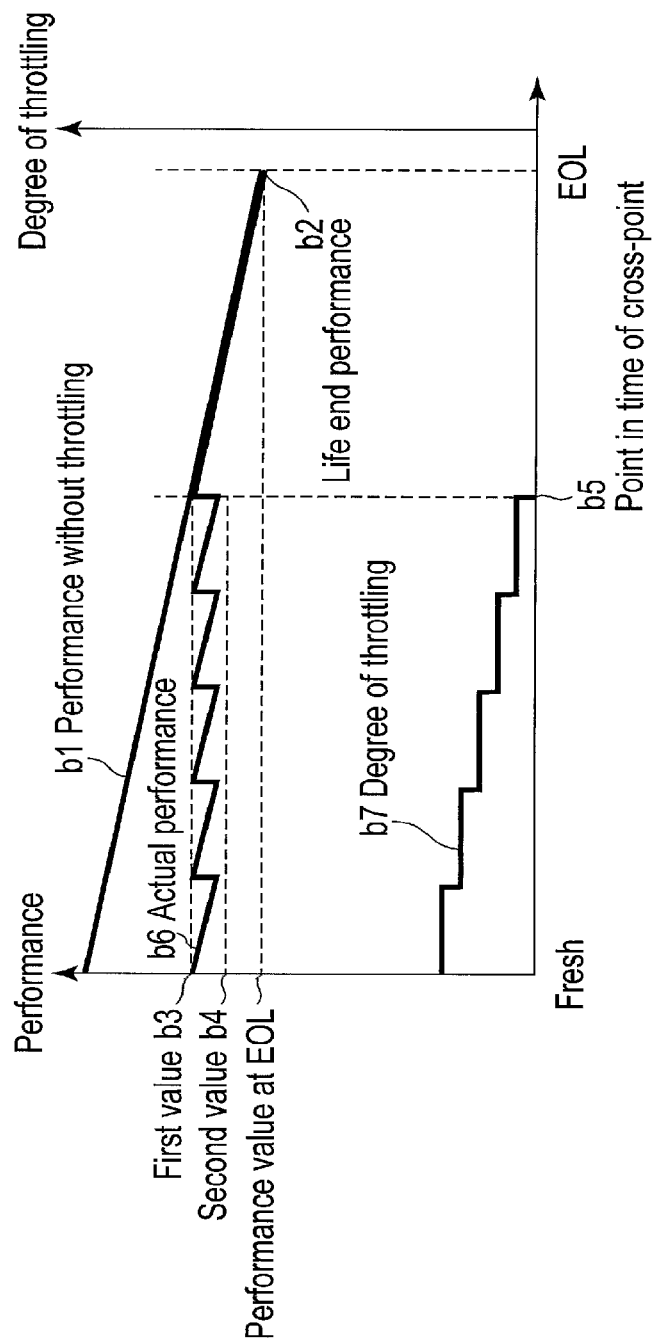
FIG. 4 is a diagram for explaining how performance of the memory system of the embodiment is controlled.

FIG. 4 is a conceptual diagram for explaining how the controller 10 controls the performance of the memory system 1.

It is herein presumed that when the host device 2 starts using the memory system 1, a Control Extension mode page with a DLC bit set to "0b" has already been transferred from the host device 2 to the memory system 1 by a MODE SELECT command.

The memory system 1 of the present embodiment has a throttling function of intentionally decreasing the performance (write performance) of the memory system 1. Throttling limits the number of times of accesses per unit time to the NAND memory 20, and is performed by, for example, adjusting a loop interval between write/erase operations (voltage application operations) repeated in a single write/erase process. Here, a set value for the limitation by throttling is referred to as a load or a degree of throttling. As the load becomes heavier, the loop interval is adjusted to be longer, and as the load becomes lighter, the loop interval is adjusted to be shorter. Adjusting the degree of throttling means adjusting the load. The degree of throttling can be adjusted by a notification from the processor 11 (operating in accordance with firmware) to the NAND interface 14.

In the memory system 1 of the present embodiment, first, some of performance values (b1 of FIG. 4) from the start of use (fresh) to the expiration of a lifetime (EOL) which are assumed if throttling is not performed are acquired by, for example, measurement with successive environmental conditions set. When a performance value (b2 of FIG. 4) at the expiration of the lifetime of the memory system 1 which is assumed if throttling is not performed is acquired, a performance upper limit (first value: b3 of FIG. 4) is next set based on the acquired performance value. Here, a value obtained by increasing the base performance value by 10% is the performance upper limit. As the first value, at least a value greater than the performance value at the expiration of the lifetime is set. When the first value is set, a performance lower limit (second value: b4 of FIG. 4) is then set between the first value and the base performance value.

Moreover, a point in time of cross-point (b5 of FIG. 4) when the performance value of the memory system 1 assumed if throttling is not performed reaches the first value is determined. Then, the controller 10 performs throttling while gradually adjusting the degree of throttling (b7 of FIG. 4) to make the actual performance value (b6 of FIG. 4) fall between the first value and the second value at least until the point in time of cross-point is exceeded.

Figure 5:
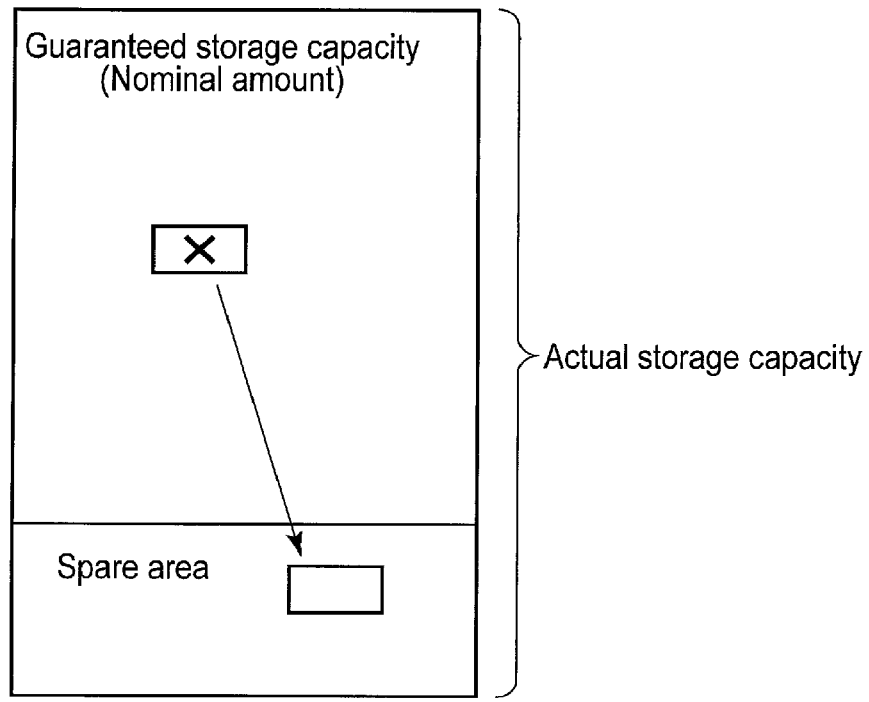
FIG. 5 is a diagram showing actual storage capacity including a spare area of a storage device.

Here, to promote an understanding of the control executed by the controller 10, over provisioning (OP) and a cluster encroachment rate will be described with reference to FIG. 5 and FIG. 6.

A storage device such as the memory system 1 of the present embodiment is required to maintain a nominal storage capacity during its lifetime. To maintain the nominal storage capacity, the storage device generally has a storage capacity greater than the nominal amount, including a spare area, as shown in FIG. 5. Here, the proportion of an unused area in the whole spare area (margin rate) will be referred to as OP.

Figure 6:
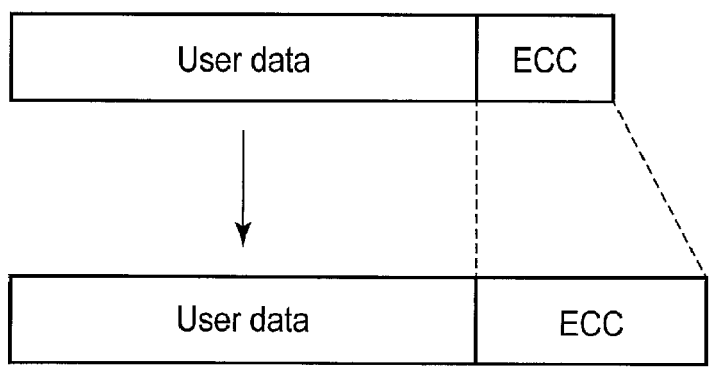
FIG. 6 is a diagram showing a change in the value of ECC added to write data for error correction.

In addition, in the storage device such as the memory device 1 of the present embodiment, measures to increase immunity against errors are also often taken by increasing a redundancy (parity) added to write data for error correction, for example, the value of an error correcting code (ECC), in accordance with, for example, a decline in reliability due to an increase in the number of times of rewriting as shown in FIG. 6. Here, the ratio of the increment of the ECC to the sum of the amount of user data and the original value of the ECC will be referred to as a cluster encroachment rate. The cluster encroachment rate represents the degree by which a storage area for user data is encroached by the ECC.

The performance of sequential write of the memory system 1 does not depend on the above-described OP, but depends on the cluster density of a logical page (block), that is, the above-described cluster encroachment rate and a deficit. On the other hand, the performance of random write of the memory system 1 greatly depends on the gear ratio calculated from the above-described OP. The gear ratio is the ratio of accesses to the NAND memory 20 for writing data required by the host device 2 to accesses to the NAND memory 20 for securing a space area. A process for securing the space area, referred to as compaction, garbage collection, etc., tends to be more often performed as the OP becomes smaller. Based on such a correlation, the gear ratio can be calculated from the OP.

Originally, throttling should be performed based on the above-described two factors. However, as described above, throttling is performed by adjusting a loop interval between write/erase operations (voltage application operations), irrespective of whether sequential write or random write is performed. Thus, these factors are insignificant. Therefore, in the memory system 1 of the present embodiment, the current performance value is calculated from the OP (having correlation with the gear ratio), assuming that the cluster density is also proportional to the OP. Needless to say, a method of calculating the current performance value of the memory system 1 is not limited to this method, and other methods can be adopted.

Moreover, in the memory system 1 of the present embodiment, the degrees of throttling for decreasing the respective performance values obtained, for example, at intervals of 5% between the performance value at the time of the start of use and the performance value at the expiration of a lifetime, to the above-described first value are each, for example, measured. The degrees of throttling are supplied to the controller 10 as a table in which they are held, for example, in the order from heaviest load.

FIG. 7 is a flowchart showing a general procedure through which the controller 10 controls the performance of the memory system 1 by throttling.

The controller 10 first sets a degree of throttling to set the performance value of the memory system 1 to the first value (step A1). The controller 10 checks the current performance value of the memory system 1 periodically (for example, at intervals of one minute), and examines whether the performance value has decreased to the second value (step A2). As described above, the controller 10 herein checks the current performance value of the memory system 1 by the current OP. If the performance value has not decreased to the second value (No in step A2), the controller 10 does nothing, and the degree of throttling is maintained as it is.

If the performance value has decreased to the second value (Yes in step A2), the controller 10 then examines whether the period of use has exceeded the point in time of cross-point (step A3). If the point in time of cross-point has not been exceeded (No in step A3), the controller 10 changes the degree of throttling to return the performance value of the memory system 1 to the first value (step A4). Changing the degree of throttling herein means reducing a load.

On the other hand, if the period of use has exceeded the point in time of cross-point (Yes in step A3), the controller 10 stops throttling (step A5).

As described above, the controller 10 checks the current performance value of the memory system 1 periodically (for example, at intervals of one minute). Next, an example of the periodic operations of the controller 10 will be described with reference to FIG. 8.

The controller 10 first determines the current OP (step B1), and determines the current performance value of the memory system 1 based on the OP (step B2). The controller 10 examines whether the current performance value has decreased to the lower limit value (second value) (step B3). If the current performance value has decreased to the lower limit value (Yes in step B3), the controller 11 then checks the current load, that is, a degree of throttling (step B4).

The controller 10 examines whether the current degree of throttling is greater than the lower limit value (state in which throttling is stopped) (step B5). If there is room for decrease (Yes in step B5), the controller 10 decreases the degree of throttling (step B6).

The controller 10 operates under the above-described procedure, whereby the throttling value is adjusted to gradually decrease, such that the performance value of the memory system 1 falls between the first value and the second value. Throttling is expected to be stopped at least after the period of use exceeds the point in time of cross-point.

It should be noted that, in a storage device such as the memory system 1 of the present embodiment, for example, if a power supply voltage decreases without any notice from the host device 2, a rapid action such as storing data which is not completely made nonvolatile at this point in time in the NAND memory 20 is required. Such a function for responding to an erroneous power supply shutoff (unexpected power loss or power failure) is referred to as power loss protection (PLP), etc. If an erroneous power supply shutoff occurs in a situation in which throttling is performed, there is a possibility that data that could have been stored in the NAND memory 20 if the memory system 1 operates with the original performance cannot be protected. Therefore, if an erroneous power supply shutoff is detected, the controller 10 immediately stops throttling and performs a PLP process.

Figure 9:
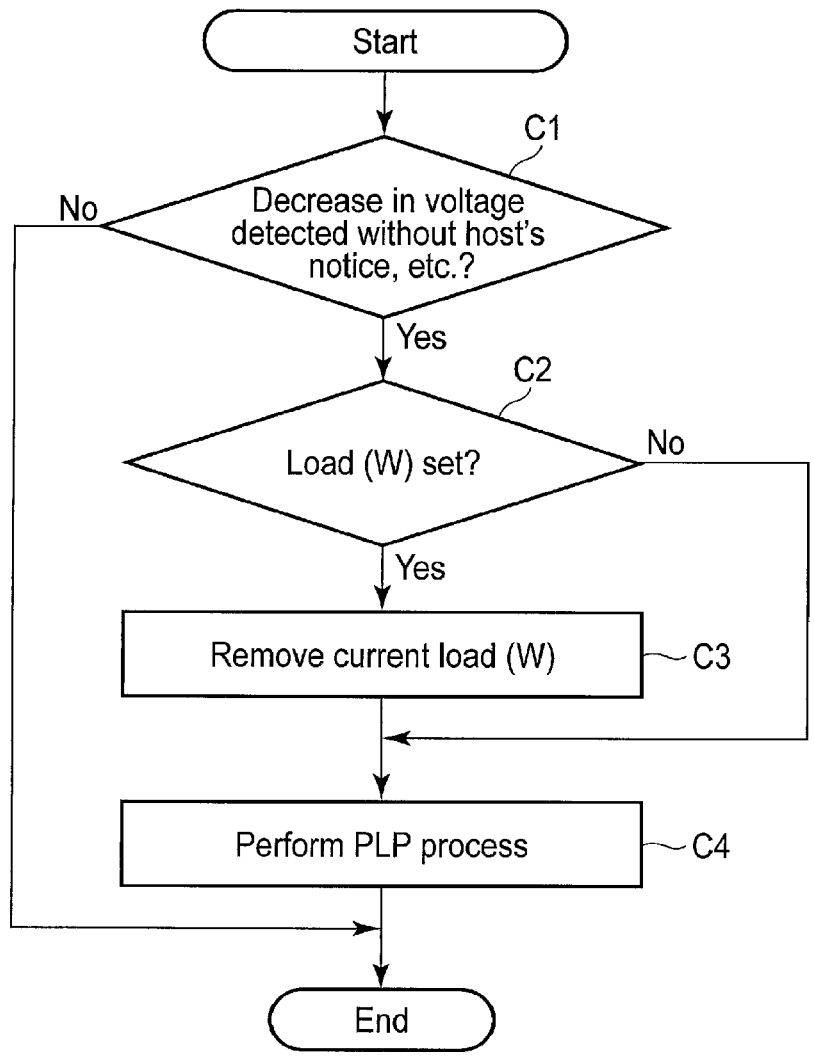
FIG. 9 is a flowchart showing a procedure for control related to throttling at the time of detection of an erroneous power supply shutoff of the memory system of the embodiment.

FIG. 9 is a flowchart showing a procedure for control related to throttling of the controller 10 at the time of detection of an erroneous power supply shutoff.

If a decrease in voltage is detected without any notice, etc., from the host device 2 (Yes in step C1), the controller 10 examines whether or not throttling is being performed (step C2). If throttling is being performed (Yes in step C2), the controller 10 removes a load, that is, sets the degree of throttling to zero, to immediately stop throttling (step C3), and performs a PIP process including writing data in the SRAM 15 and the DRAM 30 to the NAND memory 20 (step C4).

The degree of throttling set for throttling at the time of detection of an erroneous power supply shutoff is saved on the NAND memory 20 by the PLP process. Then, if the memory system 1 is restarted, the controller 10 resumes throttling by the degree of throttling.

In addition, as shown in FIG. 1, the memory system 1 of the present embodiment comprises the temperature sensor 40 for detecting a temperature in the vicinity of, for example, the controller 10 or the NAND memory 20 in the memory system 1. If the temperature detected by the temperature sensor 40 exceeds, for example, the upper limit value of a recommended operating temperature, the control of increasing the degree of throttling to limit the number of times of accesses per unit time to the NAND memory 20 may also be executed in order to lower the temperature in the memory system 1 to the recommended operating temperature.

In this manner, according to the memory system 1 of the present embodiment, the performance of an SSD can be appropriately controlled in consideration of a lifetime.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory; and
a controller configured to control access to the nonvolatile memory based on a command from a host device, wherein
the controller is configured to:
control throttling to decrease a performance value of the memory system to a value between a first performance value and a second performance value in accordance with a first command related to a setting of the memory system received from the host device, the throttling limiting the number of times of accesses per unit time to the nonvolatile memory, the first performance value including a value which is calculated based on a third performance value of the memory system and which is greater than the third performance value, the third performance value including a value which is expected to be reached at a time when a first period has elapsed since the memory system started being used if throttling is not performed, the second performance value including a value provided between the first performance value and the third performance value; and
stop controlling the throttling, when a period that has elapsed since the memory system started being used exceeds a second period shorter than the first period, the second period ending at a time when the performance value of the memory system assumed if the throttling is not performed is expected to decrease to the first performance value.

2. The memory system of claim 1, wherein the controller is configured to gradually loosen limitation by the throttling to return the performance value of the memory system to the first performance value whenever the performance value of the memory system decreases to the second performance value.

3. The memory system of claim 1, wherein the controller is configured to remove limitation by the throttling, when unexpected power loss or power failure is detected.

4. The memory system of claim 3, wherein the controller is configured to resume limitation by the throttling performed when the unexpected power loss or power failure is detected, when the memory system is restarted after the unexpected power loss or power failure is detected.

5. The memory system of claim 1, comprising a temperature sensor, wherein the controller is configured to control the throttling based on a temperature detected by the temperature sensor.

6. The memory system of claim 1, wherein the first performance value is calculated by multiplying the third performance value by a first constant.

7. The memory system of claim 6, wherein the first constant is 1.1.

8. The memory system of claim 1, wherein the throttling limits the number of times of accesses per unit time to the nonvolatile memory by adjusting a loop interval between write/erase operations repeated in a write/erase process for the nonvolatile memory.

9. The memory system of claim 1, wherein the first command is a MODE SELECT command conforming to a SCSI standard and transferring a Control Extension mode page with a device life control (DLC) bit set to zero.

10. A controlling method of a memory system comprising a nonvolatile memory, the method comprising:
receiving a command from a host device;
controlling throttling to decrease a performance value of the memory system to a value between a first performance value and a second performance value in accordance with a first command related to a setting of the memory system received from the host device, the throttling limiting the number of times of accesses per unit time to the nonvolatile memory, the first performance value including a value which is calculated based on a third performance value of the memory system and which is greater than the third performance value, the third performance value including a value which is expected to be reached at a time when a first period has elapsed since the memory system started being used if throttling is not performed, the second performance value including a value provided between the first performance value and the third performance value; and
stopping controlling the throttling, when a period that has elapsed since the memory system started being used exceeds a second period shorter than the first period, the second period ending at a time when the performance value of the memory system assumed if the throttling is not performed is expected to decrease to the first performance value.

11. The controlling method of claim 10, wherein the controlling the throttling comprises gradually loosening limitation by the throttling to return the performance value of the memory system to the first performance value whenever the performance value of the memory system decreases to the second performance value.

12. The controlling method of claim 10, wherein the controlling the throttling comprises removing limitation by the throttling, when unexpected power loss or power failure is detected.

13. The controlling method of claim 12, wherein the controlling the throttling comprises resuming limitation by the throttling performed when the unexpected power loss or power failure is detected, when the memory system is restarted after the unexpected power loss or power failure is detected.

14. The controlling method of claim 10, wherein the controlling the throttling comprises controlling the throttling based on a temperature detected by a temperature sensor.

15. The controlling method of claim 10, wherein the first performance value is calculated by multiplying the third performance value by a first constant.

16. The controlling method of claim 15, wherein the first constant is 1.1.

17. The controlling method of claim 10, wherein the throttling limits the number of times of accesses per unit time to the nonvolatile memory by adjusting a loop interval between write/erase operations repeated in a write/erase process for the nonvolatile memory.

18. The controlling method of claim 10, wherein the first command is a MODE SELECT command conforming to a SCSI standard and transferring a Control Extension mode page with a device life control (DLC) bit set to zero.

19. A memory system comprising:
a nonvolatile memory comprising a first storage area and a second storage area, the second storage area being a spare area of the nonvolatile memory; and
a controller to
control throttling based on a status of the second storage area during a time period that has elapsed since the memory system started being used, the throttling limiting the number of times of accesses per unit time to the nonvolatile memory; and
stop the throttling after the time period.

* * * * *